United States Patent Office 3,184,446
Patented May 18, 1965

3,184,446
HEIMIA ALKALOIDS
Jerry A. Weisbach, Cherry Hill, N.J., assignor to Smith Kline & French Laboratories, Philadelphia, Pa., a corporation of Pennsylvania
No Drawing. Continuation of application Ser. No. 272,527, Apr. 12, 1963. This application July 15, 1963, Ser. No. 295,205
2 Claims. (Cl. 260—236)

This invention relates to new crystalline products of manufacture and more specifically to new crystalline alkaloids of plants of the genus Heimia (family: Lythraceae). The crystalline alkaloids of this invention have useful diuretic activity.

The new alkaloids are produced from plants of two species of Heimia, namely *Heimia salicifolia* and *Heimia myrtifolia*, and are called lythrine and lythridine. The ground whole plant material of *Heimia salicifolia* is extracted with alcohol until removal of alkaloidal material is complete. The residue obtained from the extract is treated first with dilute tartaric acid solution and then a phosphoric acid-ethylacetate mixture. The combined filtered acid extracts at pH 8 are extracted with chloroform, the residue from the organic layer is dissolved in acetic acid and the solution added to 10% sulfuric acid solution. The filtered mixture is extracted with ether and the aqueous layer at pH 8 is extracted with chloroform. Removal of the organic solvent gives the alkaloidal material.

The solid dissolved in chloroform is chromatographed on 100–200 mesh Florisil (magnesia-silica gel adsorbent). The first fractions from elution with chloroform containing 2–5% methanol give a single crystalline alkaloid, lythrine, $C_{26}H_{29}NO_5$ melting at 241–242° C. It is soluble in the usual organic solvents such as chloroform, methylene chloride, dioxane, acetone and the like and insoluble in cold methanol, water or petroleum ether. Its ultraviolet absorption spectrum in ethanol exhibits the following characteristic maxima: max. λ 260 mμ (log ε 4.08) and max. λ 284 mμ (log ε 4.14). The infrared absorption spectrum obtained in Nujol (a hydrocarbon oil) mull exhibits the following characteristic bands (wavelengths expressed in microns): 2.72, 5.88 and 6.23.

Continued elution with chloroform-methanol mixtures yields a crystalline alkaloid melting at 250–251° C. (dec.) identical with the alkaloid vertine described by Ferris, J. Org. Chem., vol. 27, pp. 2985–2990, September 1962. It is soluble in chloroform, methylene chloride, benzene and methanol and insoluble in water or petroleum ether. Its ultraviolet absorption spectrum in ethanol exhibits the following characteristic maxima: max. λ 216 mμ (log ε 4.12) and max. λ 284 mμ (log ε 4.18). The infrared absorption spectrum (Nujol mull) exhibits the following characteristic bands: 2.82, 5.86 and 6.25μ.

The ground whole plant material of *Heimia myrtifolia* is extracted with ethanol and worked up as described above to yield alkaloidal material. Chromatography on Florisil essentially as described above yields lythrine in the early chloroform-5% methanol eluate, a new alkaloid lythridine in the initial chloroform-10% methanol eluate and vertine in the later fractions. The lythrine and vertine from both *H. salicifolia* and *H. myrtifolia* are identical.

The crystalline alkaloid lythridine melts at 218–219° C. and analyzes for an empirical formula of $C_{25}H_{31}NO_6$. It is soluble in chloroform, methanol, dioxane, acetone and methylene chloride and insoluble in petroleum ether. Its ultraviolet absorption spectrum in ethanol exhibits a characteristic maximum at a wavelength of 292 mμ (log ε 3.85). The infrared absorption spectrum (Nujol mull) exhibits the following characteristic bands: 2.72, 5.82 and 6.22μ.

The new alkaloids of this invention have diuretic activity as demonstrated in laboratory animals by standard procedures, for example in rats after doses of 5–15 mg/kg. orally. These alkaloids constitute a new class of diuretics and are relatively free of toxic side effects. Particularly useful is the alkaloid lythrine.

For therapeutic use the alkaloids may be formulated into pharmaceutical compositions comprising the new crystalline alkaloid or a nontoxic acid addition salt thereof and a pharmaceutical carrier. The compositions thus provided by this invention may be in any dosage unit form suitable for internal administration, for example tablets, capsules, solutions or suspensions. The carrier may thus be a solid or liquid. If a solid carrier is desired, the pure crystalline alkaloid is mixed with the carrier, such as talc, mannitol, lactose or corn starch, and filled into a soft gelatin capsule. Alternatively, the pure crystalline alkaloid is mixed with the carrier together with tableting aids, such as starch or magnesium stearate, granulated using sucrose or gelatin soltuion and tableted. Suitable liquid carriers are peanut or vegetable oil which are mixed with the alkaloid and filled into soft gelatin capsules or water to give a solution or suspension.

These compositions contain per dosage unit the desired therapeutically useful amount of pure crystalline alkaloid. The advantages afforded by this invention are obvious. Such compositions can be prepared containing exact amounts of the alkaloid to produce the desired diuretic effect. The uniformity and standardization of such effects as produced from the pure crystalline alkaloid is not possible with either the whole plant material of *H. salicifolia* or *H. myrtifolia* or crude extracts thereof.

As indicated, the alkaloidal free bases may be used in the form of a nontoxic acid addition salt. For example organic acids such as acetic, maleic, fumaric, tartaric, citric, benzoic, methanesulfonic and the like are reacted with the free base to give the corresponding salts. Similarly, inorganic acids such as hydrochloric, hydrobromic, sulfuric, phosphoric and the like are reacted with the free base to give the corresponding salts. These salts are prepared by methods well-known to the art.

The following examples illustrate the production of lythrine and lythridine.

Example 1

A. The whole ground plant of *Heimia salicifolia* (14.5 kg.) is extracted with hot alcohol until the marc gives a negative alkaloid test. The extract is concentrated in vacuo to a syrupy consistency and the residual solvent is removed at 25° C. in a stream of air. The residue is treated with a total of 12 l. of warm 2% tartaric acid solution and the mixture filtered with celite. A mixture of 0.2 M phosphoric acid and ethyl acetate (3:2) is then added to the insoluble residue (3×2.5 l.) and the resultant mixture is stirred and heated at 80° C. until the organic solvent is removed. The cooled mixture is filtered and the filtrate combined with the tartaric acid extract. The combined acid extract is made alkaline (pH 8) with concentrated ammonia solution and extracted with chloroform. Evaporation of the extract in vacuo gives a pale green foam which is dissolved in 500 ml. of acetic acid. The solution is added with stirring to 4.2 l. of cold 10% sulfuric acid solution, filtered and the filtrate extracted with a total of 3 l. of ether. The aqueous layer is made alkaline (pH 8) with ammonia and extracted with chloroform. Removal of the solvent yields a tan, foamy alkaloidal material (58 g.) which is dissolved in chloroform and chromatographed on a Florisil column (magnesia-silica gel adsorbent). The initial chloroform-5% methanol eluate on combination and evaporation in vacuo gives the crystalline alkaloid lythrine. Successive recrystallization from chloroform-methanol and methylene chloride-petroleum ether produces fine, white needles, M.P. 241–242° C.; $[\alpha]_D^{25°} = +40.6°$ (concentration = 0.3% in chloroform); Rcp value 2.01±0.09, where Rcp is defined as the ratio of the distance of movement of the thin layer spot of the compound to the distance of movement of chlorpromazine on a silica gel G thin layer plate using a chloroform methanol eluent under standard conditions.

*Analysis.*—Calculated for $C_{26}H_{29}NO_5$: C, 71.7; H, 6.7; N, 3.2; $OCH_3$ (calculated for two), 14.25; C—$CH_3$, 6.2. Found: C, 71.6; H, 6.5; N, 3.3; $OCH_3$, 14.46; C—$CH_3$, none.

The ultraviolet spectrum of lythrine exhibits the following characteristic maxima in ethanol:

max. λ 260 mμ (log ε 4.08)

max. λ 284 mμ (log ε 4.14)

When suspended in a Nujol mull, absorption bands in the infrared region of the spectrum are present at the following wavelengths expressed in microns: 2.72, 5.88 and 6.23.

The X-ray diffraction data obtained from lythrine (needles from methylene chloride-petroleum ether) are as follows:

| d (interplanar spacings in angstrom units) | $I/I_1$ (relative intensity-incident to diffracted rays) |
| --- | --- |
| 10.10 | 75 |
| 9.00 | 75 |
| 8.30 | 45 |
| 6.70 | 65 |
| 6.20 | 45 |
| 5.79 | 100 |
| 4.60 | 95 |
| 4.20 | 90 |
| 4.10 | 90 |
| 3.85 | 65 |
| 3.70 | 50 |

Reaction of the free base with a nontoxic organic or inorganic acid as described hereinabove gives corresponding acid addition salts of lythrine. For example the hydrochloride salt is prepared by solution with gaseous hydrogen chloride and dilution with ether. Recrystallization of lythrine hydrochloride from methanol produces white prisms, M.P. >300° C.

*Analysis.*—Calculated for $C_{26}H_{30}ClNO_5$: C, 66.1; H, 6.4; N, 3.0. Found: C, 66.1; H, 6.4; N, 2.9.

Treatment of lythrine free base with acetic anhydride-pyridine gives an acetate, M.P. 172–173° C.; $[\alpha]_D^{25°} = +33.1°$ (concentration = 0.75% in chloroform). Infrared bands (Nujol mull): 5.59 and 5.87μ.

B. Continued elution of the original alkaloidal material with chloroform-5–10% methanol mixtures yields the crystalline alkaloid vertine.

*Example 2*

The whole ground plant of *Heimia myrtifolia* (54 kg.) is extracted with 95% ethanol and worked up in the usual manner to yield a friable alkaloidal material (75.2 g.). Chromatography of a portion of this (60.8 g.) on Florisil, essentially as described in Example 1 above, yields lythrine (9.55 g.) in the chloroform to chloroform-5% methanol eluate, a new alkaloid lythridine (1.60 g.) in the initial chloroform-10% methanol eluate and vertine (2.95 g.) in the remaining later fractions. The identity of the lythrine and vertine obtained from both *H. salicifolia* and *H. myrtifolia* is established by melting points, mixed melting point determinations and by their superimposable X-ray diffraction patterns.

Recrystallization of lythridine from methanol-ethyl acetate-petroleum ether gives white needles, M.P. 218–219° C.; $[\alpha]_D^{25°} = -153.4°$ (concentration = 0.37% in chloroform); Rcp value 1.12±0.06.

*Analysis.*—Calculated for $C_{25}H_{31}NO_6$: C, 68.0; H, 7.1; N, 3.2; $OCH_3$ (calculated for two), 14.1. Found: C, 67.9; H, 7.2; N, 3.1; $OCH_3$, 14.2.

The ultraviolet absorption spectrum of lythridine exhibits a characteristic maximum in ethanol at a wavelength of 292 mμ (log ε 3.85).

Infrared absorption bands (Nujol mull) are present at the following wavelengths: 2.72, 5.82 and 6.22μ.

The X-ray diffraction data obtained from lythridine (needles from methanol-ethyl acetate-petroleum ether) are as follows:

| d | $I/I_1$ |
| --- | --- |
| 10.10 | 80 |
| 8.40 | 90 |
| 6.30 | 75 |
| 5.90 | 80 |
| 5.10 | 100 |
| 4.35 | 95 |
| 4.09 | 90 |
| 3.34 | 60 |

The hydrochloride salt is prepared by solution of the base in methanol, addition of gaseous hydrogen chloride and removal of the solvent in vacuo. Recrystallization from methanol-chloroform-ether yields lythridine hydrochloride as white micro needles, M.P. >320° C.

*Analysis.*—Calculated for $C_{25}H_{32}ClNO_6$: C, 62.8; H, 6.5; N, 2.9. Found: C, 62.8; H, 6.6; N, 2.9.

This application is a continuation of application Serial No. 272,527, filed April 12, 1963, now abandoned.

What is claimed is:
1. Lythrine, a crystalline substance analyzing for the empirical formula $C_{26}H_{29}NO_5$, being characterized by:
   a melting point of 241–242° C.;
   an optical rotation as follows:
   $[\alpha]_D^{25°} = +40.6°$ (concentration = 0.3% in chloroform);
   an ultraviolet absorption spectrum in ethanol with the following maxima:
   max. λ 260 mμ (log ε 408), and
   max. λ 284 mμ (log ε 4.14);
   an infrared absorption spectrum in a hydrocarbon oil with bands at the following wavelengths, expressed in microns: 2.72, 5.88 and 6.23;
   X-ray diffraction data as follows (needles from methylene chloride-petroleum ether):

| d (angstrom units) | $I/I_1$ (relative intensity) |
| --- | --- |
| 10.10 | 75 |
| 9.00 | 75 |
| 8.30 | 45 |
| 6.70 | 65 |
| 6.20 | 45 |
| 5.79 | 100 |
| 4.60 | 95 |
| 4.20 | 90 |
| 4.10 | 90 |
| 3.85 | 65 |
| 3.70 | 50 | a hydrochloride salt having a melting point of >300° C.; and an acetate having:
  a melting point of 172–173° C.;
  an optical rotation: $[\alpha]_D^{25°} = +33.1°$ (concentration=0.75% in chloroform); and
  infrared absorption bands at wavelengths of 5.59 and 5.87 microns.

2. Lythridine, a crystalline substance analyzing for the empirical formula $C_{25}H_{31}NO_6$, being characterized by:
  a melting point of 218–219° C.;
  an optical rotation as follows:
    $[\alpha]_D^{25°} = -153.4°$ (concentration= 0.37% in chloroform);
  an ultraviolet absorption spectrum in ethanol with a maximum at a wavelength of 292 m$\mu$ (log $\epsilon$ 3.85);
  an infrared absorption spectrum in a hydrocarbon oil with bands at the following wavelengths, expressed in microns: 2.72; 5.82 and 6.22;
  X-ray diffraction data as follows (needles from methanol-ethyl acetate-petroleum ether):

| $d$ (angstrom units) | $I/I_1$ (relative intensity) |
|---|---|
| 10.10 | 80 |
| 8.40 | 90 |
| 6.30 | 75 |
| 5.90 | 80 |
| 5.10 | 100 |
| 4.35 | 95 |
| 4.09 | 90 |
| 3.34 | 60 | and a hydrochloride salt having a melting point of >320° C.

References Cited by the Examiner

Ferris: Amer. Chem. Soc., Abstracts of Papers No. 141 (1962), page 13-0.

Ferris: Jour. of Org. Chem., vol. 27 (1962), pages 2985–2990.

IRVING MARCUS, *Primary Examiner.*

NICHOLAS S. RIZZO, *Examiner.*